(12) United States Patent
Hornung et al.

(10) Patent No.: US 11,204,771 B2
(45) Date of Patent: Dec. 21, 2021

(54) METHODS AND APPARATUS FOR HANDLING PROCESSOR LOAD INSTRUCTIONS

(71) Applicant: Arm Limited, Cambridge (GB)

(72) Inventors: Alexander Alfred Hornung, Cambridge (GB); Jose Gonzalez-Gonzalez, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/662,418

(22) Filed: Oct. 24, 2019

(65) Prior Publication Data

US 2021/0124587 A1    Apr. 29, 2021

(51) Int. Cl.
*G06F 9/38* (2018.01)
*G06F 9/30* (2018.01)

(52) U.S. Cl.
CPC ........ *G06F 9/3844* (2013.01); *G06F 9/30043* (2013.01); *G06F 9/30145* (2013.01)

(58) Field of Classification Search
CPC .................................................... G06F 9/3844
See application file for complete search history.

(56) References Cited

U.S. PATENT DOCUMENTS

| | | | |
|---|---|---|---|
| 7,856,548 B1 * | 12/2010 | Nelson | G06F 9/3832 |
| | | | 712/225 |
| 2002/0023204 A1 * | 2/2002 | Barowski | G06F 9/3832 |
| | | | 712/239 |
| 2017/0286119 A1 * | 10/2017 | Al Sheikh | G06F 9/3806 |
| 2017/0371790 A1 * | 12/2017 | Dwiel | G06F 12/0811 |
| 2019/0065964 A1 * | 2/2019 | Al Sheikh | G06N 20/00 |

* cited by examiner

*Primary Examiner* — Michael J Metzger
(74) *Attorney, Agent, or Firm* — Nixon & Vanderhye P.C.

(57) ABSTRACT

Aspects of the present disclosure relate to an apparatus comprising decode circuitry to receive an instruction and identify the received instruction as a load instruction, and prediction circuitry to predict, based on a prediction scheme, a target address of the load instruction, and trigger a speculative memory access in respect of the predicted target address.

16 Claims, 7 Drawing Sheets

METHODS AND APPARATUS FOR HANDLING PROCESSOR LOAD INSTRUCTIONS

BACKGROUND

The present technique relates to the field of processors, and more particularly the handling of instructions within processing apparatus.

Various types of instructions can be performed by processing circuitry. One example is a load instruction, for loading data from a storage (such as a memory) for performance of data processing operations. For example, the data may be loaded into a register of the processing circuitry. Such load instructions typically identify the data to be loaded by way of a target address, identifying the location in the storage at which the data is stored.

The time taken to perform a load instruction can vary significantly depending on where the data is stored. For example, data may be temporarily cached in a cache memory, with accesses to data in the cache memory being faster than accesses to un-cached data that is stored in a main memory. In some example systems, the latency associated with performance of a load instruction can vary from two processor cycles to hundreds of processor cycles, depending on where the data is stored.

While a load instruction is performed, subsequent instructions in a processing pipeline can be stalled. As load instructions can make up more than 25% of the total number of dynamic instructions, this can cause significant negative impact to processor performance. The effect on performance depends on the latency of the load instructions: if a higher fraction of load instructions have a high latency, the effect on performance will be more significant.

There is therefore a desire to reduce the latency associated with load instructions and thereby to improve processor performance.

SUMMARY

At least some examples provide an interconnect apparatus comprising:
decode circuitry to receive an instruction and identify the received instruction as a load instruction;
prediction circuitry to:
predict, based on a prediction scheme, a target address of the load instruction; and
trigger a speculative memory access in respect of the predicted target address.
Further examples provide a method comprising:
receiving an instruction;
identifying the received instruction as a load instruction;
predicting, based on a prediction scheme, a target address of the load instruction; and
triggering a speculative memory access in respect of the predicted target address.

Further aspects, features and advantages of the present technique will be apparent from the following description of examples, which is to be read in conjunction with the accompanying drawings.

DESCRIPTION OF EXAMPLES

As indicated above, an example apparatus comprises decode circuitry to receive an instruction and identify the received instruction as a load instruction. The example apparatus further comprises prediction circuitry to predict, based on a prediction scheme, a target address of the load instruction. The actual determination of the target address may not occur until a later time. For example, the load instruction may have source operands, i.e. values on which the target address depends. In some instances, all source operands are available when the load instruction is decoded and so the target address can be immediately determined. However, in other instances, one or more source operands are not available when the load instruction is decoded. For example, they may be the output of one or more other instructions which have not been executed when the presently-discussed instruction is received. The prediction circuitry thus allows the target address to be predicted before it can be determined.

The prediction circuitry is further configured to trigger a speculative memory access in respect of the predicted target address. If the prediction of the target address was accurate, this speculative accessing can reduce the latency associated with performing the load instruction. For example, the speculative memory access may cause the data associated with the predicted target address to be cached. Then, when the load instruction is performed, the latency associated with retrieving the data is lower than it would be if the data was not cached: in such a situation, the data would be retrieved from memory when the load instruction is performed. As set out above, this operation would be more time-consuming.

The presently-described apparatus can thus reduce the latency associated with performance of load operations, in particular in situations in which the load operation cannot be performed at the time of decoding (for example because not all source operands are available). The stalling of later instructions, for example which depend on the data loaded by the load operation in question, is thus reduced. Overall processor performance is thereby improved.

In examples, the apparatus comprises instruction execution circuitry. The instruction execution circuitry is configured to determine whether the target address of the load instruction matches the predicted target address and, responsive to the target address of the load instruction not matching the predicted target address, issue a non-speculative memory access in respect of the target address of the load instruction. This allows the correct data to be loaded in the event that it is determined, at the execution stage, that the prediction was inaccurate.

In one such example, the instruction execution circuitry is configured to provide to the prediction circuitry prediction accuracy feedback indicating whether the target address of the load instruction matches the predicted target address. The prediction circuitry is configured to maintain prediction state information, and update the prediction state information based on the prediction accuracy feedback. The prediction state information may for example comprise prediction confidence information indicative of a confidence associated with the prediction of the target address. The prediction circuitry can thus maintain an up-to-date indication of the prediction accuracy. This allows the prediction accuracy to be tracked, as well as allowing prompt detection of events such as a sudden drop (or rise) in accuracy.

In one example in which prediction accuracy feedback is implemented, the prediction circuitry is configured to block the updating of the prediction state information in respect of received load instructions which meet filtering criteria. This therefore allows filtering of instructions for which it might not be desirable to update the prediction state information, for example because prediction accuracy feedback in respect of those load instructions would not yield useful information. This increases the usefulness of the prediction state information.

As an example, the filtering criteria may identify, for filtering, load instructions for which all source operands are available at a time of performing the predicting. As explained above, the actual target address of such a load instruction can be immediately determined, and so the data can be immediately loaded without prediction. The prediction (which may or may not be performed in such situations) can therefore be considered less useful or even superfluous (at least in some examples), and so feedback as to its accuracy could be considered to not provide useful information. Such load instructions can therefore be filtered, so that the maintained prediction accuracy information reflects only the accuracy of non-superfluous predictions.

Alternatively or additionally, the prediction circuitry may be configured to identify whether at least one instruction following the load instruction is dependent on the load instruction. Dependent instructions would be stalled if the execution of the load instruction were to be delayed. Conversely, in some systems (for example in which instructions can be executed out-of-order or in parallel), instructions that are not dependent on the load instruction would not be stalled if the execution of the load instruction were to be delayed: their performance is independent of the latency associated with performance of the load instruction. The filtering criteria may then identify, for filtering, load instructions for which said identifying is negative, i.e. load instructions on which no subsequent instructions depend. In such a situation, the prediction would provide less advantage in terms of avoiding stalling of subsequent instructions, and so it may be deemed less important for the accuracy of such predictions to be taken into account.

In an example, the prediction circuitry is configured to flag retrieved load instructions which meet filtering criteria such as the aforementioned filtering criteria. The instruction execution circuitry may be responsive to said flag to block the provision of prediction accuracy feedback in respect of flagged load instructions. This reduces the amount of communication between the execution circuitry and the prediction circuitry, thereby reducing the level of system resource usage and improving overall performance.

In an example, the prediction circuitry is configured to determine whether retrieved load instructions meet filtering criteria such as those discussed above, and to block the triggering of the speculative memory access in respect of retrieved load instructions which meet the filtering criteria. As explained above, the filtering criteria serve to identify load instructions for which the prediction is deemed to be not useful (or less useful). This example thereby reduces system resource usage, by blocking the prediction for such instructions and thus only performing the prediction in situations in which the prediction is deemed to be useful.

The prediction circuitry may additionally be configured to maintain filtering confidence information indicative of a confidence associated with the determining whether the retrieved load instructions meet the filtering criteria. The filtering confidence thus reflects a confidence in whether the filtering criteria are likely to be met. The prediction circuitry may then be configured to determine, based on the filtering confidence information, whether to perform said blocking. For example, if it is determined that the filtering criteria have a high likelihood of being met for a given load instruction, the prediction based on that load instruction may be blocked. Conversely, if it is determined that the filtering criteria have a low likelihood of being met for a given load instruction, the prediction based on that load instruction may be performed. Overall resource usage can thereby be reduced.

In an extension of this filtering functionality, deep in-order pipelines can be configured for loads to access a cache even before an issue stage, if a filtering logic indicates a benefit for this (for example to avoid a structural hazard). Out-of-order pipelines with any type of address predictor can benefit from the filtering scheme by, for example, preventing prediction for loads for which the prediction would not be likely to provide a significant latency reduction.

In examples, the prediction scheme comprises predicting the target address of the load instruction by applying an offset to a target address of a previously executed load instruction, the previously executed load instruction having a different instruction address to the load instruction. The previously executed instruction may for example be a most recently executed load instruction prior to said load instruction. In other words, the prediction is based on the delta between the target addresses of the current load and the previous load in the program order. This can be termed the "inter-stride", in contrast with an "intra-stride" predictor which would be based on the history of target addresses for a single given load instruction. This inter-stride prediction is relatively light in terms of the required resources, whilst still providing acceptable accuracy.

In one such example, the prediction scheme comprises determining the offset based on a prior offset, the prior offset being an offset between a target address associated with a prior execution of said previously executed load instruction and a target address associated with a prior execution of said load instruction. The prediction may thus be based on an assumption that the inter-stride between the target address of the presently-executed load instruction and the previously-executed load instruction, which may for example be the previous load instruction in the program order, is at least somewhat likely to remain the same as a previous time in which those two load instructions were executed.

Alternatively or additionally, the prediction circuitry may be configured to additionally implement an alternative prediction scheme, the alternative prediction scheme comprising predicting the target address of the load instruction by applying an offset to a target address associated with a previous execution of said load instruction. The alternative scheme may thus be based on the aforementioned intra-stride. The prediction circuitry may then be configured to maintain prediction confidence information in respect of said prediction scheme and said alternative prediction scheme, and select between said prediction scheme and said alternative prediction scheme based on the prediction confidence information. The prediction circuitry can thus assess, in a given situation, which of the prediction scheme and the alternative prediction scheme (i.e. the inter-stride prediction scheme and the intra-stride prediction scheme) has a higher confidence of providing an accurate prediction, and select between the schemes accordingly.

The prediction confidence information may comprise a confidence value associated with said prediction scheme and a confidence value associated with said alternative prediction scheme. The prediction circuitry may be configured to select the one of the prediction scheme and the alternative prediction scheme for which the prediction confidence information indicates a higher confidence.

In one such example, the instruction execution circuitry is configured to provide to the prediction circuitry prediction accuracy feedback indicating an accuracy of the prediction of the target address. The prediction circuitry is configured to update the prediction confidence information based on the prediction accuracy feedback. The prediction circuitry can thus maintain an up-to-date indication of the relative confidence associated with each prediction scheme, and thereby account for changing operating conditions.

The prediction confidence information may comprise prediction confidence information associated with each of a plurality of load instructions. The prediction scheme can thus be selected on a per-load-instruction basis. For example, one load instruction may have a higher confidence associated with an inter-stride prediction scheme, whilst another load instruction may have a higher confidence associated with an intra-stride prediction scheme. This increases the granularity of the prediction scheme selection, and thus improves the overall prediction accuracy. This may be implemented as a cache like structure based on a function of the instruction address, such that resources are saved by having multiple addresses map onto one prediction confidence information entry. The indexing scheme may be selected such that addresses which alias to the same entry are far apart in the address space, to reduce the likelihood of more than one being relevant at any given time.

Examples of the present disclosure will now be described with reference to the drawings.

Figure 1:
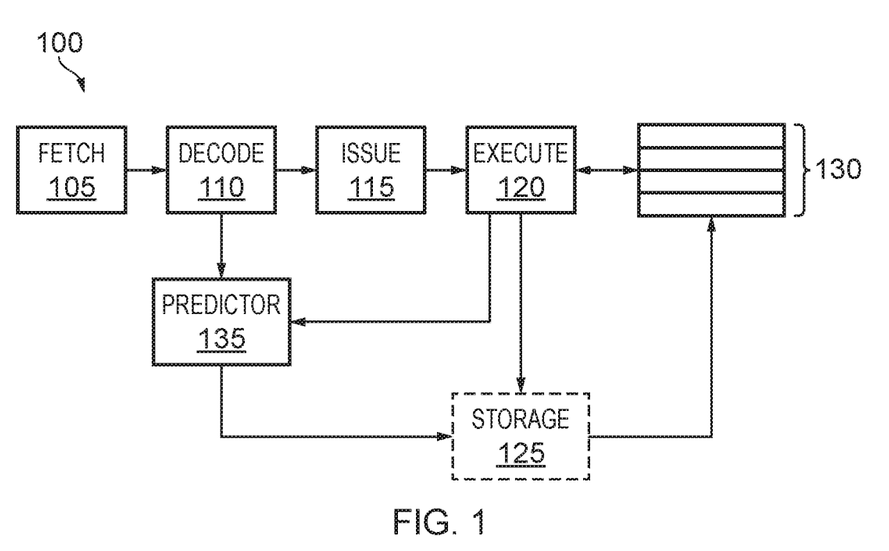
FIG. 1 schematically depicts a processing apparatus, implementing a processing pipeline, according to an example.

FIG. 1 schematically depicts a processing apparatus 100, implementing a processing pipeline, according to an example. The apparatus 100 comprises a series of stages, each being implemented by circuitry. It will be appreciated that this is an example, and other implementations may include additional or fewer stages than those shown.

The apparatus comprises a fetch stage 105 configured to fetch instructions to be executed from an instruction cache or memory. The fetch unit transmits the fetched instructions to a decode stage 110, which decodes received instructions and transmits them to an issue stage 115. The issue stage maintains a queue of received instructions and issues them to execute stage 120. The issuing may be based on an issue policy, for example such that instructions can be issued once all source operands for that instruction are available (the source operands having been produced in earlier instructions).

The execute stage includes execution circuitry modules, such as an arithmetic logic unit (ALU) and a load/store (LD/ST) unit, for performing processing operations. Data on which the processing operations are performed is loaded (responsive to a load command from the LD/ST unit) from a storage 125 (which may be external to apparatus 100) into a bank of registers 130 accessible to the execute stage 120. Conversely, data in a given one of the registers 130 can be stored in the memory 125 responsive to a store command from the LD/ST unit.

As explained above, significant latency can be associated with the execution of load instructions, in particular if the data to be loaded takes time to retrieve from the storage 125. For example, the storage 125 may comprise a main memory and one or more caches, with loads from the cache being faster than loads from the main memory. As another example, latency can be incurred if one more source operands for the load instruction are not available at a time when the load instruction could otherwise be executed (for example when the load instruction is queued in the issue stage 115). This latency can have knock-on effects, for example causing stalling of subsequent instructions which depend on the data loaded by the load instruction.

In order to reduce such latency effects, the apparatus 100 comprises a predictor 135. The predictor is configured to apply a prediction scheme to predict a target address of a load instruction decoded by the decode stage 110. Based on this, the predictor 135 triggers a speculative access to the storage 125 in respect of the predicted target address, thereby causing the data associated with the predicted target address to be speculatively loaded into one or more of the registers 130 (or, in other examples, into another register or buffer).

As a consequence of the data being speculatively loaded, when the load instruction is ready for execution (for example because the source operands have become available), provided that the prediction was correct the data will be ready in the registers 130. The data will thus not have to be retrieved from the storage 125. The execute stage 120 can therefore determine that execution of the load instruction can be avoided, averting latency that would be associated with retrieving the data from the memory. Conversely, if the prediction was incorrect, the load instruction can be executed to retrieve the data.

The execute stage 120 can provide prediction accuracy feedback to the predictor 135, indicative of whether the target address of the load instruction matches the predicted target address. For example, the execute stage 120 could feed back a binary indication of whether or not the prediction was accurate. Alternatively, the execute stage 120 could feed back information indicative of the actual target address of the load instruction regardless of the accuracy of the prediction, for the predictor to determine whether the prediction was accurate. This allows the execute stage to be implemented without the functionality to determine prediction accuracy.

Figure 2:
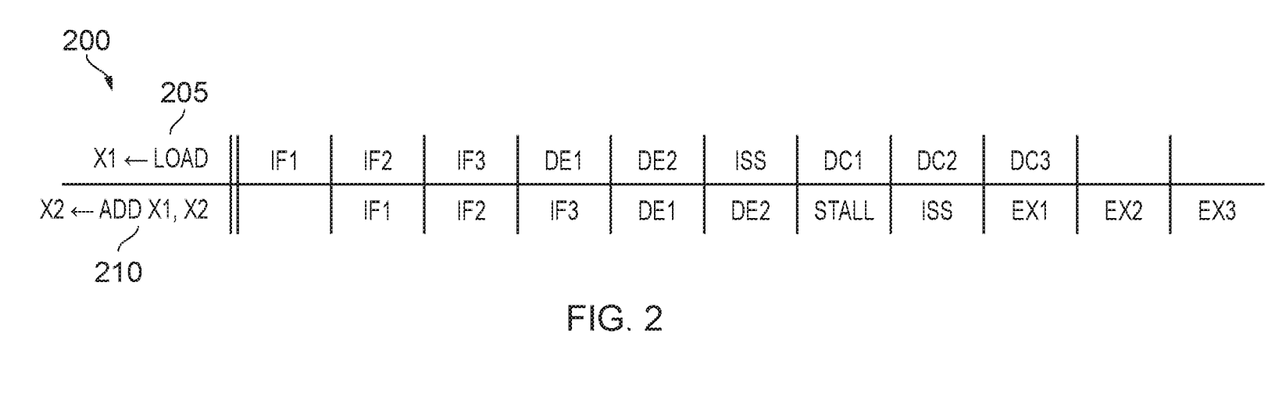
FIG. 2 schematically illustrates operation of a processing pipeline according to a comparative system which does not implement the predictor of FIG. 1.

FIG. 2 schematically illustrates operation of a processing pipeline 200 according to a comparative system which does not implement the predictor 135 of FIG. 1. The pipeline illustrates a load operation 205 into a register x1, followed by an add operation which adds the contents of register x1 to the contents of register x2. The add instruction is therefore dependent on the load instruction: it cannot be performed until the target data of the load instruction has been loaded into register x1. In this example, an instruction fetch (IF) takes three processor cycles, a decode (DE) takes two processor cycles, an issue (ISS) takes one processor cycle and a cache access (DC) takes two processor cycles, followed by a third in which the data is available.

The load instruction 205 therefore proceeds through the pipeline 200 as follows: the instruction is fetched (cycles IF1, IF2, IF3). The instruction is then decoded (cycles DE1, DE2). Following decode, the instruction is ready for issue (cycle ISS). The data to be loaded is then loaded from the cache (cycles DC1 in which the target address is determined, DC2 in which the cache is accessed, and DC3 in which the data is available in register x1).

The add instruction 210 proceeds through the pipeline 200 one cycle behind the load instruction. It therefore proceeds from issue (IF1, IF2, IF3) to decode (DE1, DE2). However, at this point the target data of the load instruction has not yet been loaded into register x1. The add instruction therefore stalls for one cycle. After stalling for one cycle, the add instruction is issued (ISS) and executed (EX1, EX2, EX3). The execution of the add instruction therefore begins when the target data of the load instruction has been loaded into register x1.

Figures 3A, 3B:
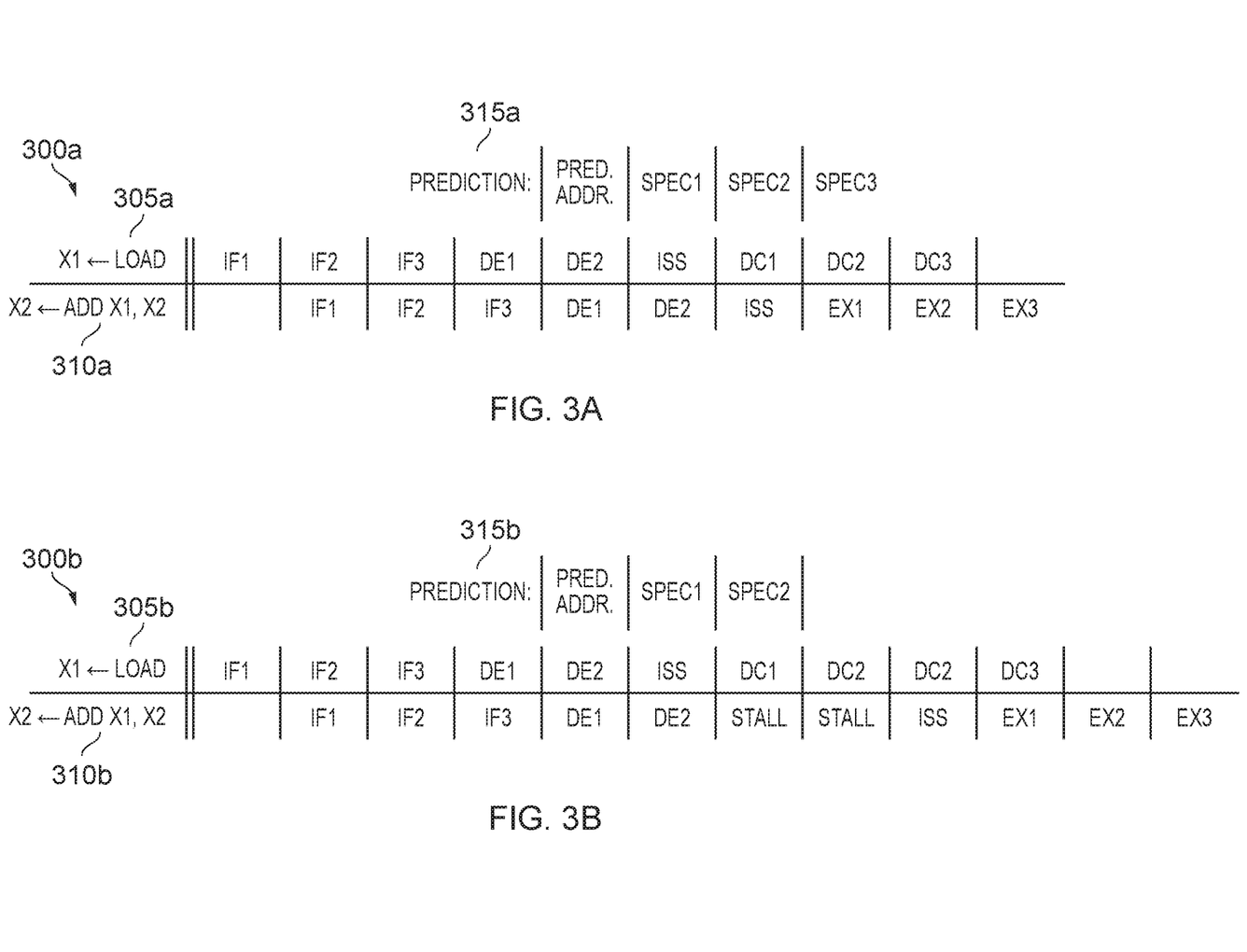
FIGS. 3A and 3B schematically illustrate operation of processing pipelines according to an example of the present disclosure.

FIGS. 3A and 3B schematically illustrate operation of processing pipelines 300a, 300b according to an example of the present disclosure, in which the predictor 135 of FIG. 1 is implemented. FIG. 3A illustrates an example in which the predictor makes an accurate prediction, and FIG. 3B illustrates an example in which the predictor makes an inaccurate prediction. The number of cycles to implement each pipeline stage is the same as for the pipeline 200 of FIG. 2. As for FIG. 2, each of FIGS. 3A and 3B shows a load operation 305a, 305b into register x1, followed by an add operation which adds the contents of register x1 to the contents of register x2.

In FIG. 3A, the load instruction 305a proceeds through the pipeline 300a in the same manner as the load instruction 205 of FIG. 2, i.e. via issue (IF1, IF2, IF3), decode (DE1, DE2), issue (ISS) and cache access (DC1, DC2, DC3). However, a prediction process 315a implemented by the predictor 135 is performed in parallel with the load instruction. Beginning during the decode stage, the target address of the load instruction is predicted during cycle DE2 of the load instruction. The predicted target address is then speculatively accessed, which takes three cycles SPEC1, SPEC2, SPEC3 (in the same manner as the above-described non-speculative cache access DC1, DC2, DC3). As the prediction is correct, the target data is available in register x1 one cycle earlier than in the case of the pipeline 200 of FIG. 2. The predicted address can be verified in cycle DC2 when the data becomes non-speculative.

The add instruction 310a proceeds through the pipeline 300a one cycle behind the load instruction, in the same manner as the add instruction 210 of FIG. 2, i.e. via issue (IF1, IF2, IF3) and decode (DE1, DE2). However, because the target data of the load instruction is available one cycle earlier, the add instruction can immediately proceed to issue ISS (without the stall of FIG. 2) and then to execution (EX1, EX2, EX3). Execution of the add instruction 310a is therefore completed one cycle earlier than the add instruction 210 of FIG. 2.

In FIG. 3B, the load instruction 305b begins proceeding through the pipeline 300b in the same manner as the load instructions 205, 305a of FIGS. 2 and 3A, via fetch (IF1, IF2, IF3) and decode (DE1, DE2). As in FIG. 3A, the target address is predicted during cycle DE2 of the load instruction and the speculative access (SPEC1, SPEC2) is initiated. However, at cycle DC1 the predicted address is tested, and at cycle DC2 it is determined that the prediction was incorrect. The non-speculative access is then performed (second DC2, DC3). As a consequence, the target data is available in register x1 one cycle later than the pipeline 200 of FIG. 2.

The add instruction 310b begins proceeding through the pipeline 300b one cycle behind the load instruction, in the same manner as the add instructions 210, 310 of FIGS. 2 and 3A, via issue (IF1, IF2, IF3) and decode (DE1, DE2). However, because the target data of the load instruction is available one cycle later than in FIG. 2 (and two cycles later than in FIG. 3A in which the prediction was correct), the add instruction stalls for two cycles before proceeding to issue (ISS) and then to execution (EX1, EX2, EX3). Execution of the add instruction 310a is therefore completed one cycle later than the add instruction 210 of FIG. 2, and two cycles later than the add instruction 310a of FIG. 3A. However, provided that the prediction is accurate more often than it is inaccurate, this still represents an overall improvement in system performance.

Figure 4:
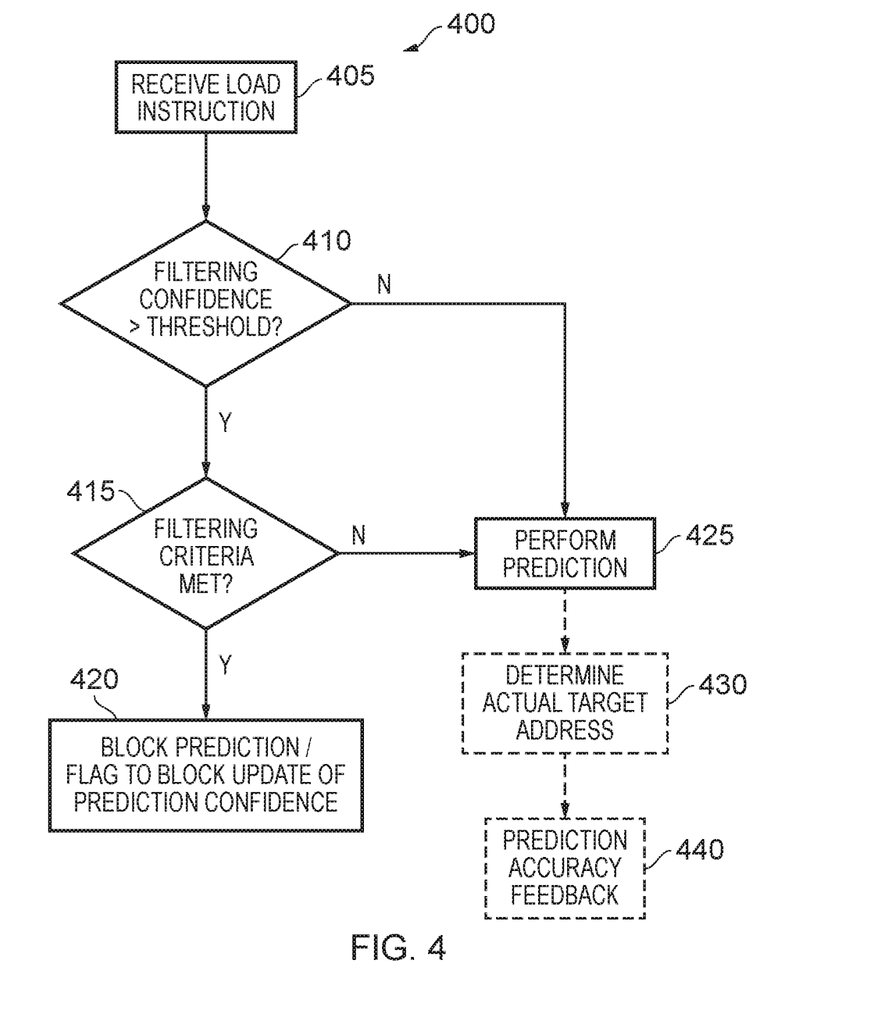
FIG. 4 is a flow diagram illustrating a method according to examples of the present disclosure.

FIG. 4 is a flow diagram illustrating a method 400 according to examples of the present disclosure. The method illustrates a filtering process, by which it can be determined for example whether or not to block the prediction of the target address of a given load instruction. The method can be implemented by a predictor such as the predictor 135 of FIG. 1.

At block 405, a load instruction is received.

At block 410, it is determined whether a filtering confidence exceeds a threshold. The filtering confidence indicates a confidence in the filtering process. The filtering confidence thus reflects a confidence that the filtering will correctly identify load instructions for which prediction of the target address is not deemed to be useful.

If the filtering confidence exceeds the threshold, flow proceeds to block 415, where it is determined whether one or more filtering criteria are met. The filtering criteria identify load instructions for which it is deemed to not be useful to predict the target address.

One example of a filtering criterion is that a load instruction can be filtered if there are no subsequent instructions which depend on the load instruction (or no subsequent dependent instructions within a given number of instructions following the load instruction). In such a situation, the prediction of the target address would not give an advantage in preventing a stall of a subsequent dependent instruction (i.e. as shown in FIG. 3A), because there is no such dependent instruction. In one example, this is extended by determining, when subsequent dependent instructions are identified, whether they would actually be delayed by a delay in the execution of the load instruction. For example, the dependent instructions may also be awaiting other source operands that do not arise from the load instruction. In such a case, a load instruction could be filtered even though there are subsequent dependent instructions.

Another example of a filtering criterion is that a load instruction can be filtered if all its source operands are available when the predicting is performed. In such a situation, the actual target address can be immediately determined. Whilst there may still be an advantage to performing the prediction (for example as set out above with reference to FIG. 3A), this advantage is less than would be the case if the source operands are not available: in this case, the load instruction would stall until the source operands became available. Furthermore, in other example systems (in which the pipelined operations take a different number of processor cycles from those of FIGS. 3A and 3B), there may be no advantage to performing the prediction where all source operands are available.

If one or more filtering criteria are met, flow proceeds to block 420 where the prediction is blocked. In some examples, a prediction confidence value may be maintained to indicate a confidence in the prediction of the target address for a given load instruction. This confidence value can be updated based on feedback indicating whether a given prediction was accurate or inaccurate. In some examples, instead of or as well as blocking the prediction, this updating is blocked at block 420 so that the maintained prediction confidence only reflects predictions which are deemed to be useful.

If the filtering confidence is determined at block 410 to be less than the threshold, or if the filtering criteria are determined at block 415 to not be met, flow proceeds to block 425 where the prediction is performed and the speculative load carried out as described above.

Flow can then proceed to block 430 in which the actual target address is determined. This step may be carried out by a different entity, such as the execute stage 120 of FIG. 1. Then, at block 440, prediction accuracy feedback is provided indicating whether the prediction of the target address was accurate or inaccurate. This step may also be carried out by a different entity from blocks 405-425, such as the execute stage 120 of FIG. 1.

Figure 5:
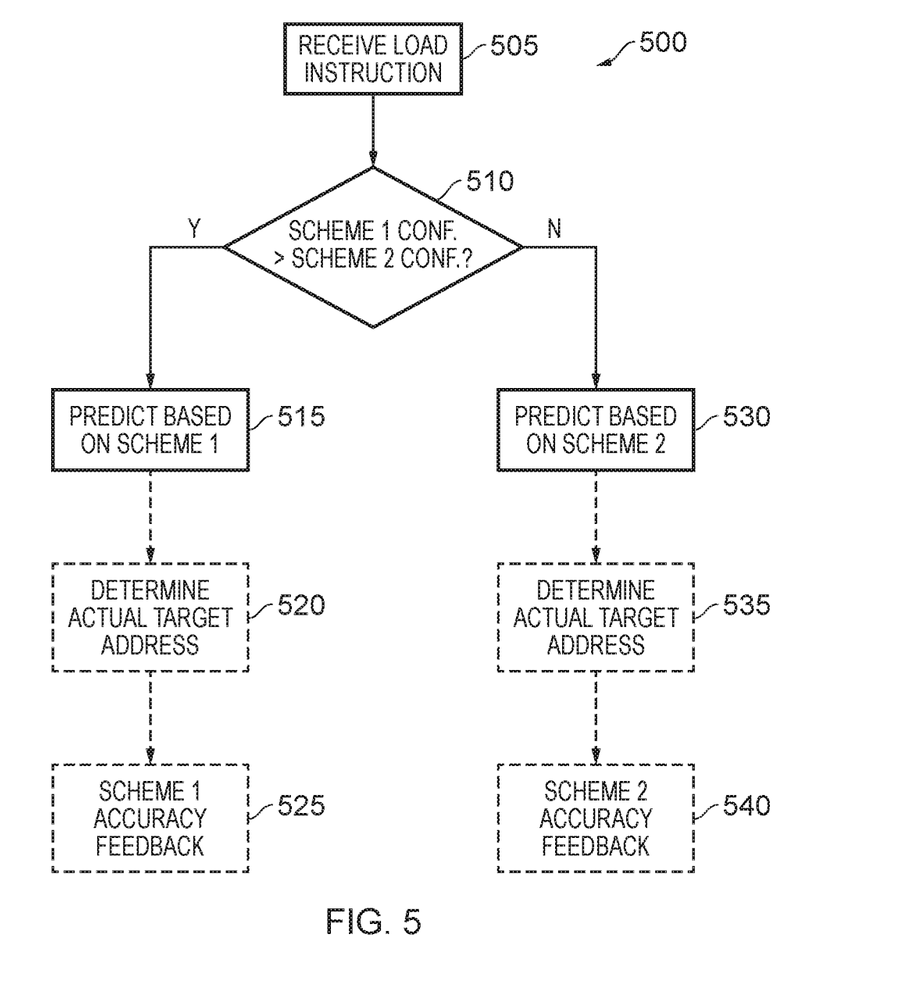
FIG. 5 is a flow diagram illustrating a method according to an example of the present disclosure.

FIG. 5 is a flow diagram illustrating a method 500 according to an example of the present disclosure, which may be implemented by the predictor 135 of FIG. 1. The method 500 may be implemented in combination with the method 400 of FIG. 4. The method 500 is implemented by a predictor which implements two prediction schemes. For example, as described above, one prediction scheme may be an "intra-stride" prediction scheme and another may be an "inter-stride" prediction scheme. The predictor maintains prediction confidence information indicative of a confidence in the accuracy of each prediction scheme for a given load instruction.

At block 505, a load instruction is received.

At block 510, it is determined whether the confidence in the first prediction scheme is higher than the confidence in the second prediction scheme. In an extension of this method (not shown in FIG. 5), it may be determined whether the confidence in both the first prediction scheme and the second prediction scheme is below a threshold: if so, in some examples no prediction is performed and the load instruction is performed without prediction in the manner described above with reference to FIG. 2. In the discussion of the remainder of FIG. 5 below, it is assumed that either such a threshold is not implemented, or that the confidence in both prediction schemes is above the threshold.

If the confidence in prediction scheme 1 is greater than the confidence in prediction scheme 2, flow proceeds to block 515 where the target address of the load instruction is predicted based on prediction scheme 1 and the corresponding data is speculatively accessed as described above. Flow then proceeds to block 520, where the actual target address is determined (for example by the execution stage 120 of FIG. 1). Accuracy feedback is then provided at block 525 (for example to the predictor 135), which updates the confidence information for prediction scheme 1.

Conversely, if the confidence in prediction scheme 1 is less than the confidence in prediction scheme 2, flow proceeds to block 530 where the target address of the load instruction is predicted based on prediction scheme 2 and the corresponding data is speculatively accessed as described above. Flow then proceeds to block 535, where the actual target address is determined (for example by the execution stage 120 of FIG. 1). Accuracy feedback is then provided at block 540 (for example to the predictor 135), which updates the confidence information for prediction scheme 2.

The method 500 thereby allows the predictor to switch between two prediction schemes depending on the dynamic relative confidence associated with those schemes. This can be extended to larger numbers of prediction schemes.

Figure 6:
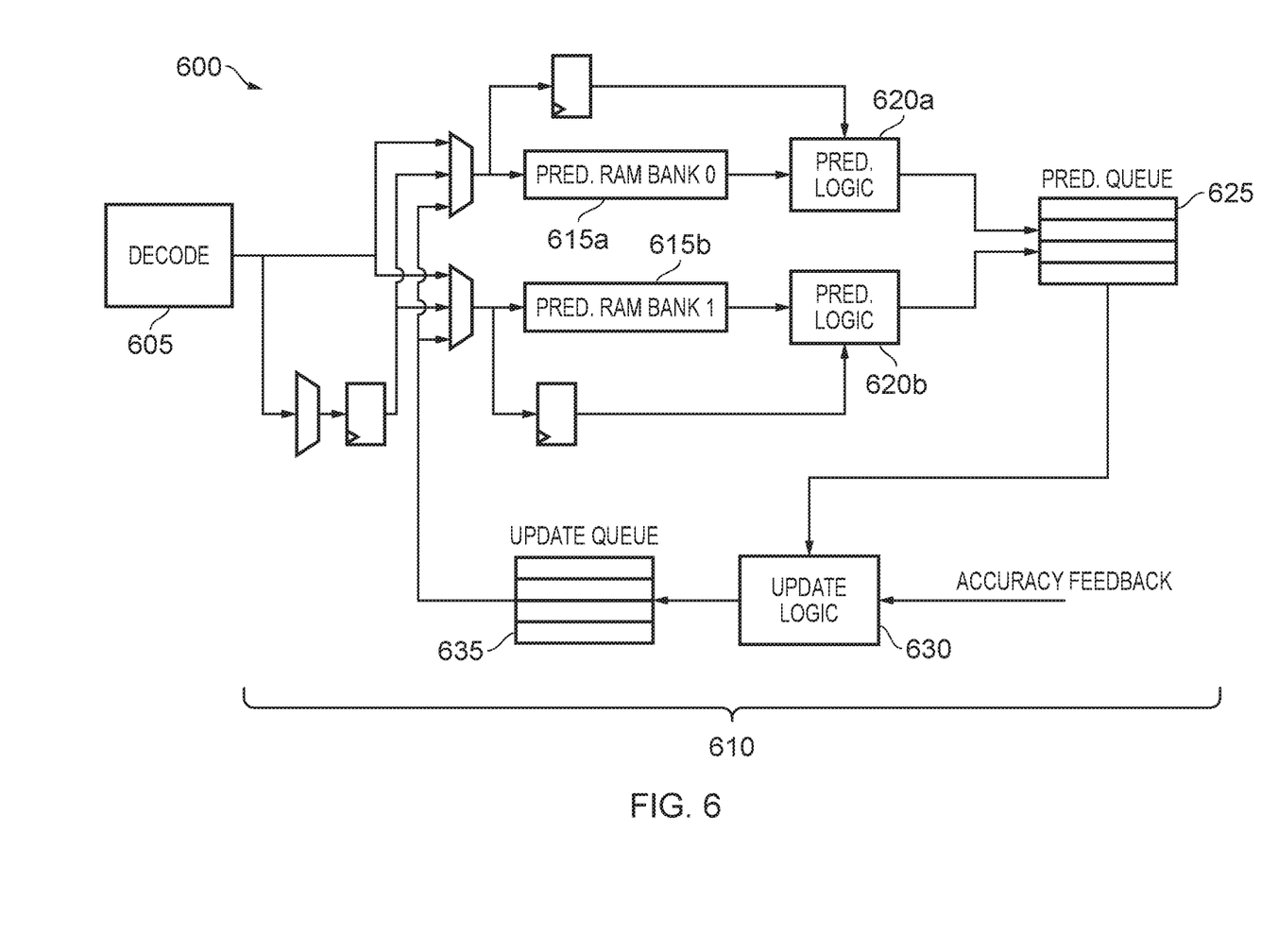
FIG. 6 schematically depicts an apparatus comprising decode and prediction circuitry implementing an inter-stride prediction scheme and an intra-stride prediction scheme, according to an example of the present disclosure.

FIG. 6 schematically depicts an apparatus 600 comprising decode 605 and prediction 610 circuitry implementing an inter-stride prediction scheme and an intra-stride prediction scheme, according to an example of the present disclosure. As described elsewhere herein, the inter-stride predictor targets loads with a target address which shows a constant delta with respect to the target address of the previous load in the program order. The intra-stride predictor targets loads in a loop with a target address that is the same as a previous iteration of that loop, plus a constant stride. Other prediction schemes could also be implemented, such as a context-based predictor which detects patterns of strides.

The decode circuitry 605 decodes a load instruction as described elsewhere herein, and provides the decoded load instruction to the prediction circuitry 610. All subsequently discussed components of the apparatus 600 are components of the prediction circuitry 610.

Information indicative of the decoded load instruction, for example a subset of the bits of the program counter associated with the load instruction, is provided to two prediction random access memory (RAM) banks 615a, 615b. The prediction RAM banks 615a, 615b store a series of entries, each entry comprising:

a tag associated with the program counter of the load instruction, for example an XORed version thereof;

the last target address of the load instruction;

an 8-bit "inter-stride", i.e. the predicted delta with respect to the target address of the previous load instruction;

a 3-bit confidence value associated with the inter-stride predictor;

an 8-bit "intra-stride", i.e. the predicted delta with respect to the target address of the previous execution of the load instruction; and a 3-bit confidence value associated with the intra-stride predictor.

The prediction circuitry 610 further comprises prediction logic units 620a, 620b, which determine which (if any) prediction scheme to use based on the confidence values and determine the predicted target address to provide to a prediction queue 625. The queued predicted target addresses are then speculatively accessed.

The prediction circuitry 610 further comprises update logic unit 630, which receives the predicted target addresses from the prediction queue 625 and also receives prediction accuracy feedback (for example from an execution unit such as the execution stage 120 of FIG. 1). Based on these inputs, the update logic 630 determines how the prediction confidence values associated with each predictor should be updated. For example, each prediction confidence value can be updated positively or negatively in response to accurate or inaccurate predictions of the corresponding predictor. The updates are provided to update queue 635, for provision back to the prediction RAM banks 615a, 615b. Based on these updates, the prediction RAM banks 615a, 615b can update the confidence values as appropriate.

As an example of predictor updating, if an entry is already stored for the load in question, the intra-stride can be calculated by subtracting the previous target address and the current one. The stride field can be updated accordingly. If there was a previously computed stride, and it was the same as current one, the confidence bits are increased, otherwise they are decreased. The inter-stride sent is also compared with the stored inter-stride and the confidence is increased if both match. If no entry is stored for the load in question, a new entry is assigned and the tag, last virtual address and confidence bits are initialised.

Figure 7:
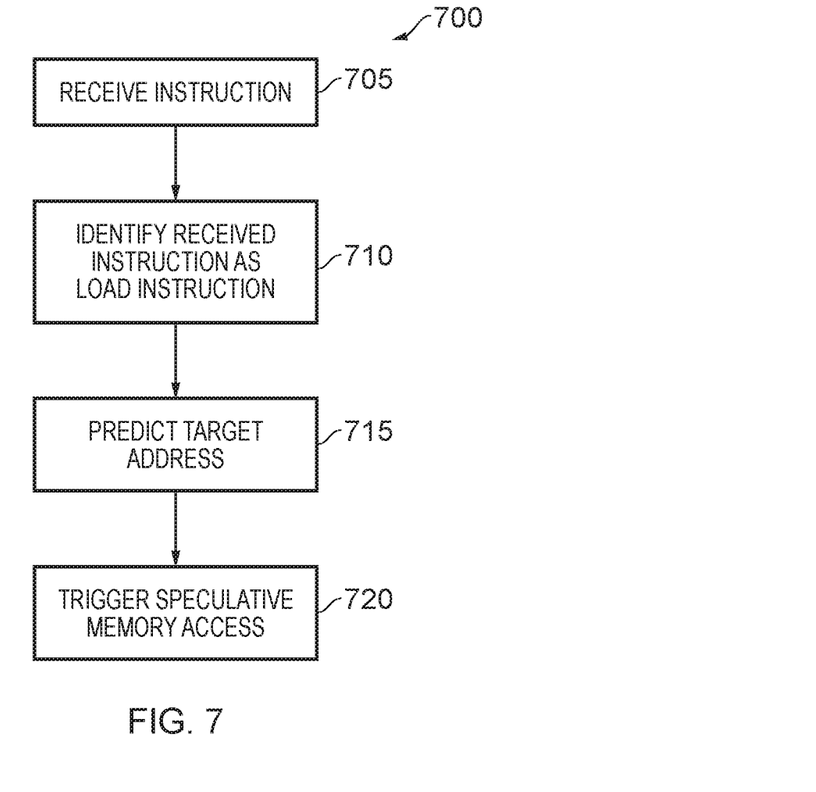
FIG. 7 is a flow diagram illustrating a method according to examples of the present disclosure.

FIG. 7 is a flow diagram illustrating a method 700 according to examples of the present disclosure.

At block 705, an instruction is received.

At block 710, the received instruction is identified as a load instruction.

At block 715, the target address of the received load instruction is predicted for example as described elsewhere herein.

At block 720, a speculative memory access is triggered in respect of the predicted target address.

Apparatuses and methods are thus provided for predicting target addresses of load instructions, based on which the corresponding data is speculatively accessed. It will be appreciated from the above description that this reduces the latency associated with performing load operations, as well as reducing the chance of subsequent instructions stalling as a result of this latency. Overall processor performance is thereby improved.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:

1. Apparatus comprising:
   decode circuitry to receive an instruction and identify the received instruction as a load instruction;
   prediction circuitry to:
   predict, based on a prediction scheme, a target address of the load instruction; and
   trigger a speculative memory access in respect of the predicted target address, and instruction execution circuitry to:
   determine whether the target address of the load instruction matches the predicted target address;
   responsive to the target address of the load instruction not matching the predicted target address, issue a non-speculative memory access in respect of the target address of the load instruction; and
   provide to the prediction circuitry prediction accuracy feedback indicating whether the target address of the load instruction matches the predicted target address, the prediction circuitry being further configured to:
   maintain prediction state information;
   update the prediction state information based on the prediction accuracy feedback; and
   block the updating of the prediction state information for load instructions for which a target address has been predicted which meet filtering criteria, wherein the filtering criteria identify, for filtering, load instructions for which all source operands are available at a time of performing the predicting.

2. The apparatus of claim 1, wherein the prediction state information comprises prediction confidence information indicative of a confidence associated with the prediction of the target address.

3. The apparatus of claim 1, wherein:
   the prediction circuitry is configured to identify whether at least one instruction following said load instruction is dependent on said load instruction; and
   the filtering criteria identify, for filtering, load instructions for which said identifying is negative.

4. The apparatus of claim 1, wherein:
   the prediction circuitry is configured to flag retrieved load instructions which meet filtering criteria; and
   the instruction execution circuitry is responsive to said flag to block the provision of prediction accuracy feedback in respect of flagged load instructions.

5. The apparatus of claim 1, wherein the prediction circuitry is configured to:
   determine whether retrieved load instructions meet filtering criteria; and
   block the triggering of the speculative memory access in respect of retrieved load instructions which meet the filtering criteria.

6. The apparatus of claim 5, wherein the prediction circuitry is configured to:
   maintain filtering confidence information indicative of a confidence associated with the determining whether the retrieved load instructions meet the filtering criteria; and
   determine, based on the filtering confidence information, whether to perform said blocking.

7. The apparatus of claim 1, wherein the prediction scheme comprises predicting the target address of the load instruction by applying an offset to a target address of a previously executed load instruction, the previously executed load instruction having a different instruction address to the load instruction.

8. The apparatus of claim 7, wherein the prediction scheme comprises determining the offset based on a prior offset, the prior offset being an offset between a target address associated with a prior execution of said previously executed load instruction and a target address associated with a prior execution of said load instruction.

9. The apparatus of claim 7, wherein the previously executed load instruction is a most recently executed load instruction prior to said load instruction.

10. The apparatus of claim 7, wherein:
    the prediction circuitry is configured to additionally implement an alternative prediction scheme, the alternative prediction scheme comprising predicting the target address of the load instruction by applying an offset to a target address associated with a previous execution of said load instruction; and
    the prediction circuitry is configured to:
    maintain prediction confidence information in respect of said prediction scheme and said alternative prediction scheme; and
    select between said prediction scheme and said alternative prediction scheme based on the prediction confidence information.

11. The apparatus of claim 10, wherein the prediction confidence information comprises a confidence value associated with said prediction scheme and a confidence value associated with said alternative prediction scheme.

12. The apparatus of claim 10, wherein the prediction circuitry is configured to select the one of the prediction scheme and the alternative prediction scheme for which the prediction confidence information indicates a higher confidence.

13. The apparatus of claim 10, wherein:
the instruction execution circuitry is configured to provide to the prediction circuitry prediction accuracy feedback indicating an accuracy of the prediction of the target address; and
the prediction circuitry is configured to update the prediction confidence information based on the prediction accuracy feedback.

14. The apparatus of claim 10, wherein the prediction confidence information comprises prediction confidence information associated with each of a plurality of load instructions.

15. The apparatus of claim 10, wherein the prediction circuitry is responsive to the prediction accuracy information indicating a prediction accuracy below a threshold, for both of the prediction scheme and the alternative prediction scheme, to block the prediction of the target address and the triggering of the speculative memory access.

16. A method comprising:
receiving an instruction;
identifying the received instruction as a load instruction;
predicting, based on a prediction scheme, a target address of the load instruction;
triggering a speculative memory access in respect of the predicted target address;
determining whether the target address of the load instruction matches the predicted target address;
responsive to the target address of the load instruction not matching the predicted target address, issuing a non-speculative memory access in respect of the target address of the load instruction;
providing to the prediction circuitry prediction accuracy feedback indicating whether the target address of the load instruction matches the predicted target address;
maintaining prediction state information;
updating the prediction state information based on the prediction accuracy feedback; and
blocking the updating of the prediction state information for load instructions for which a target address has been predicted which meet filtering criteria,
wherein the filtering criteria identify, for filtering, load instructions for which all source operands are available at a time of performing the predicting.

* * * * *